United States Patent

Don et al.

Patent Number: 6,045,644
Date of Patent: Apr. 4, 2000

[54] NEAR NET-SHAPE FABRICATION OF FRICTION DISK RING STRUCTURES

[76] Inventors: Jarlen Don, 25 Mound Ct., Carbondale, Ill. 62901; Jar-Shuen Don, No. 18 Alley 15, Lane 603, Ding-Jong Rd., Sanming, KaoHsiung; Chia-Yu Tang, 4F No. 2B, 133 Alley, Nan-Ming Street, Shing Ten City, Taipei, both of Taiwan

[21] Appl. No.: 09/121,929

[22] Filed: Jul. 24, 1998

[51] Int. Cl.[7] .................................................. B32B 31/00

[52] U.S. Cl. ........................ 156/148; 156/204; 156/227; 156/259

[58] Field of Search .................................... 156/148, 204, 156/217, 227, 250, 259

[56] References Cited

U.S. PATENT DOCUMENTS

| | | | |
|---|---|---|---|
| 3,867,491 | 2/1975 | Marin | 264/29 |
| 4,066,489 | 1/1978 | Hannum et al. | 156/258 |
| 5,546,880 | 8/1996 | Ronyak et al. | 112/475.01 |

*Primary Examiner*—Sam Chuan Yao
*Attorney, Agent, or Firm*—Armstrong Teasdale LLP

[57] ABSTRACT

Friction disk rings and a method for near net-shape fabrication of the friction disk rings are disclosed. The method includes cutting a friction material into tiled trapeziform strips. The strips are then folded into a disk ring structure that can be hot-pressed, stitched, or sewed, to preserve the disk ring structure. The disk rings include multiple layers of a friction material, each layer includes a plurality of triangular shaped panels. In one embodiment, the triangular shaped panels are symmetric with respect to the radial center of the disk ring.

12 Claims, 9 Drawing Sheets

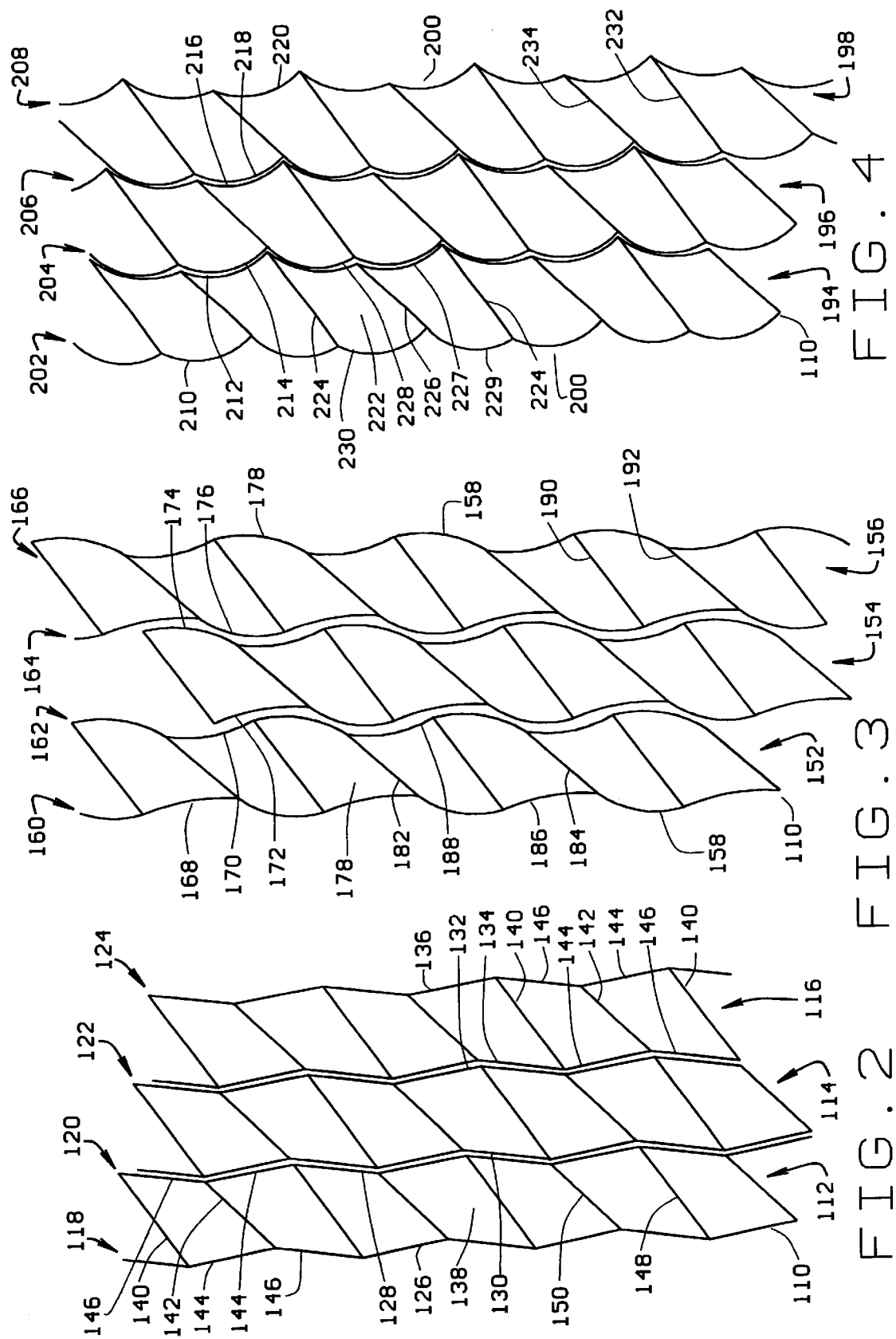

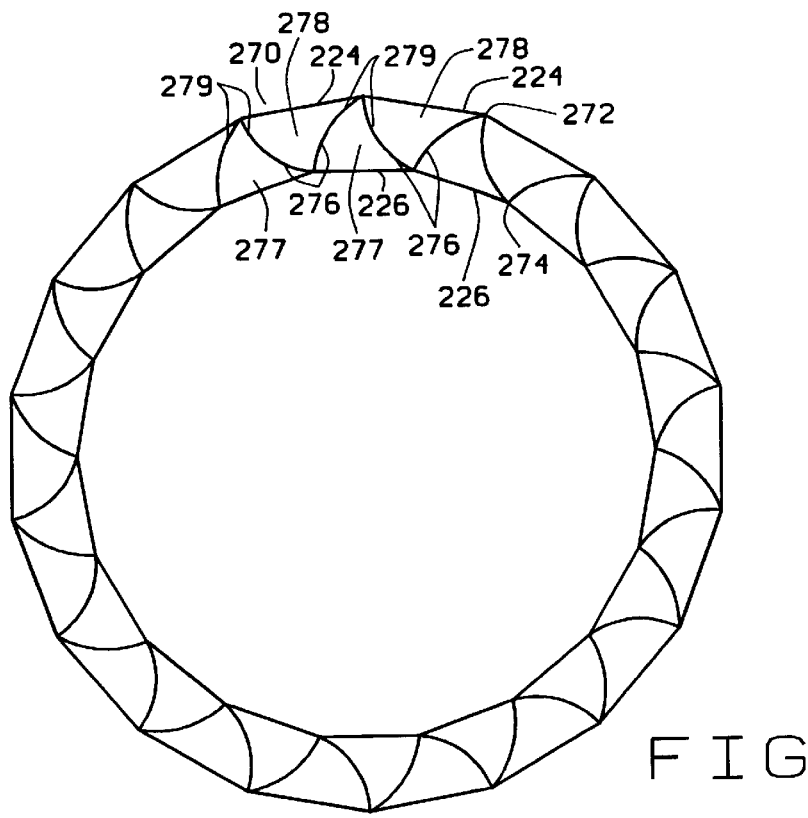
FIG. 9
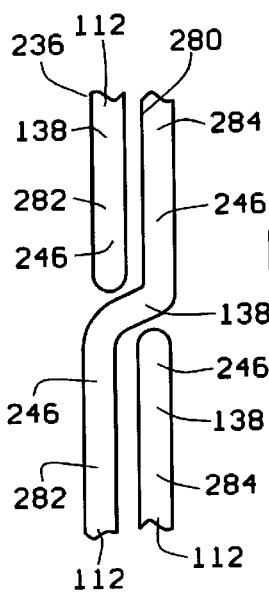
FIG. 10
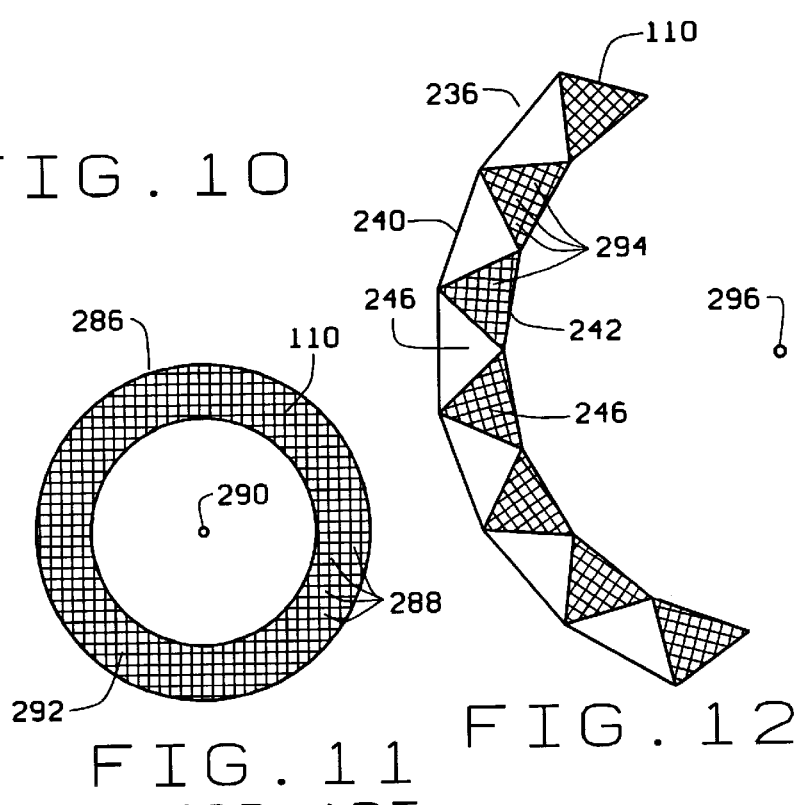
FIG. 11
PRIOR ART
FIG. 12

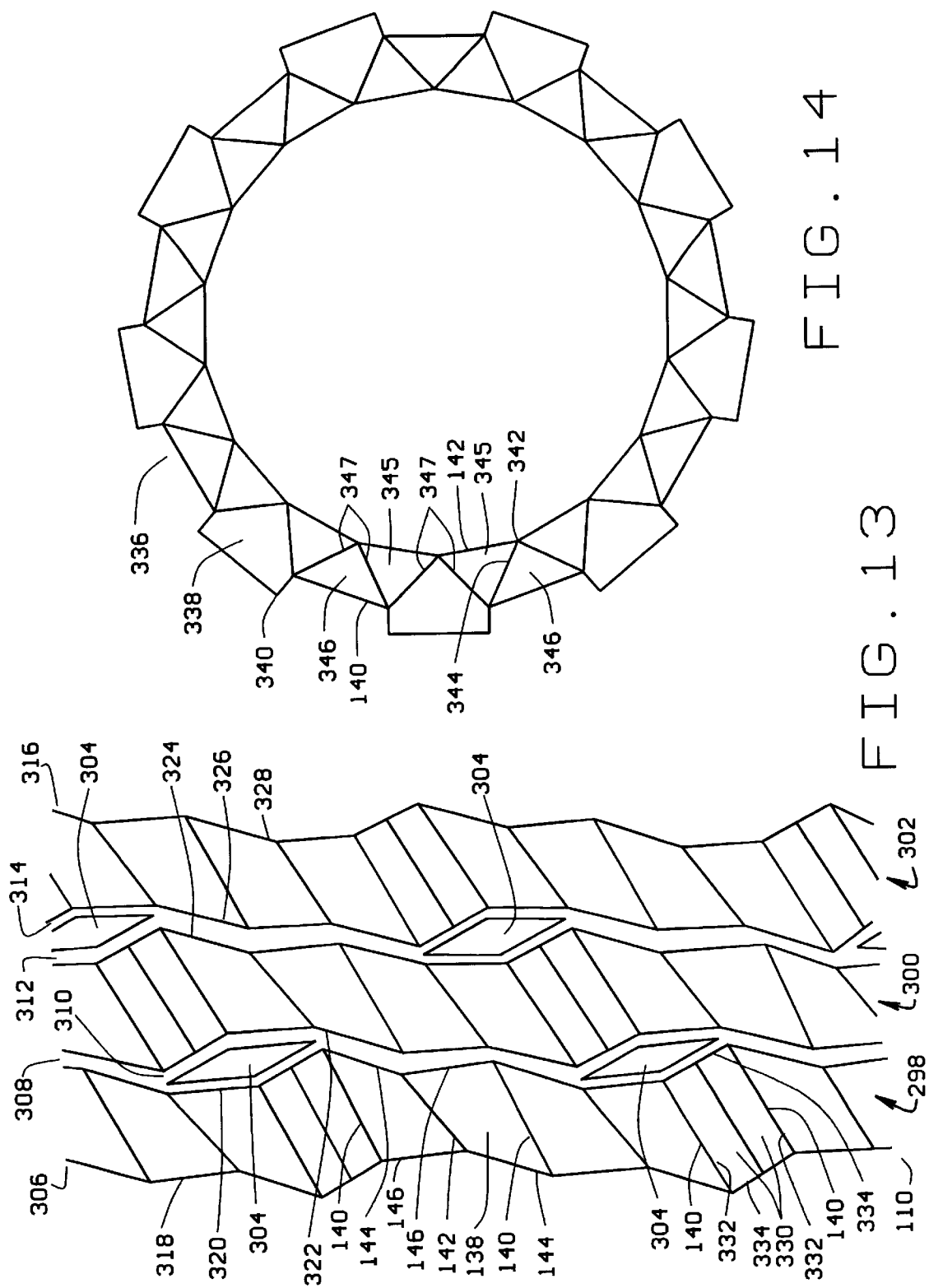

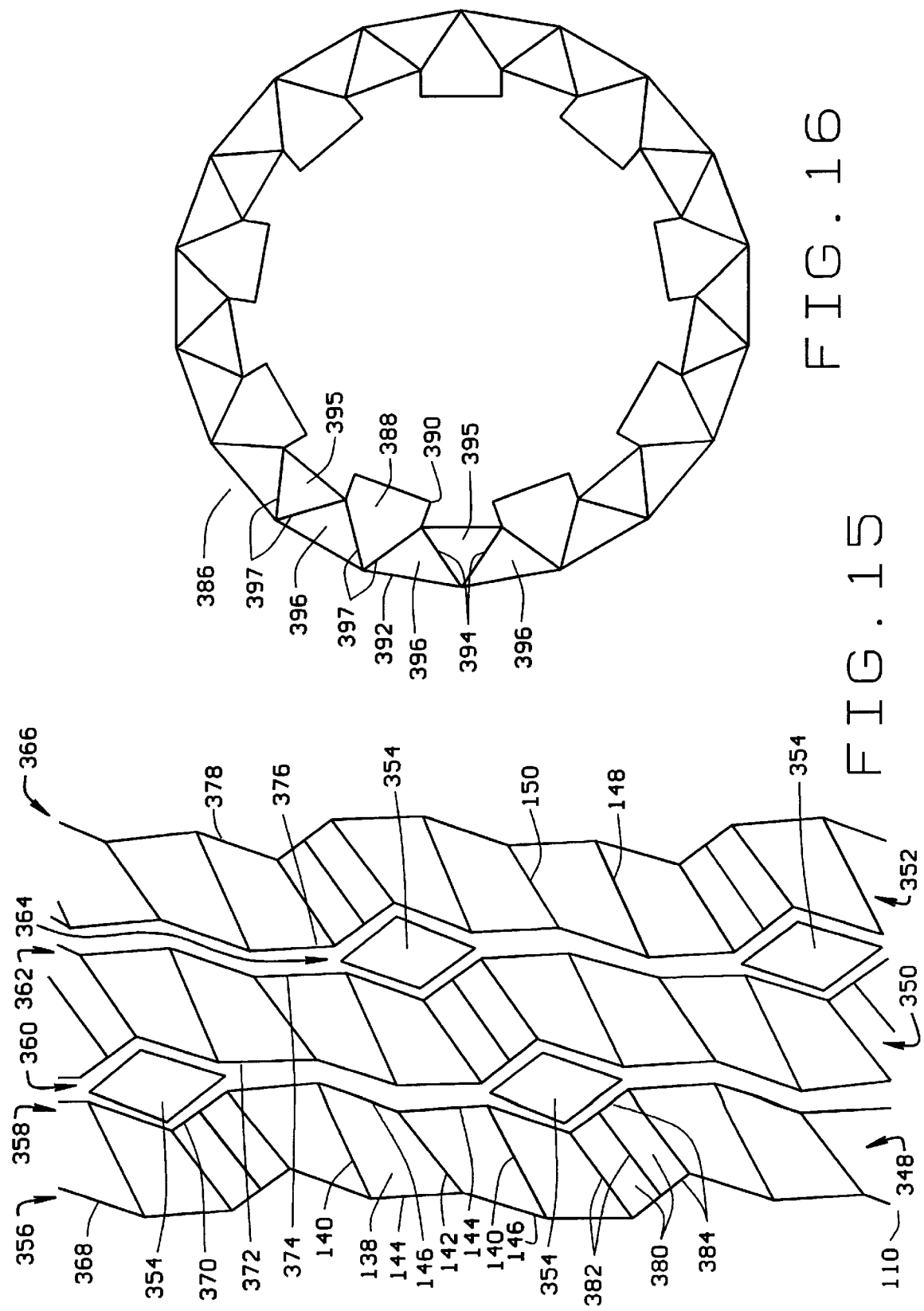

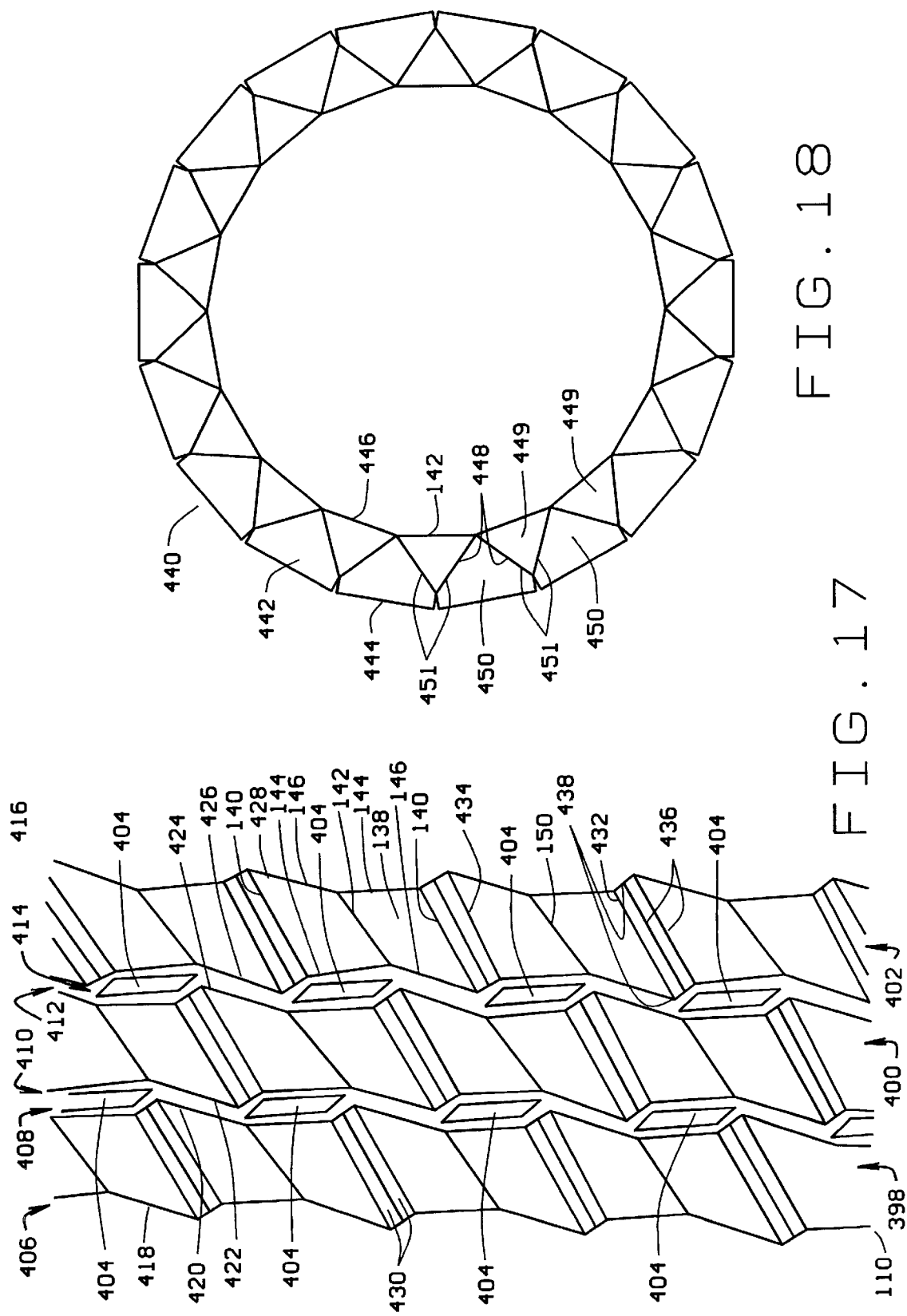

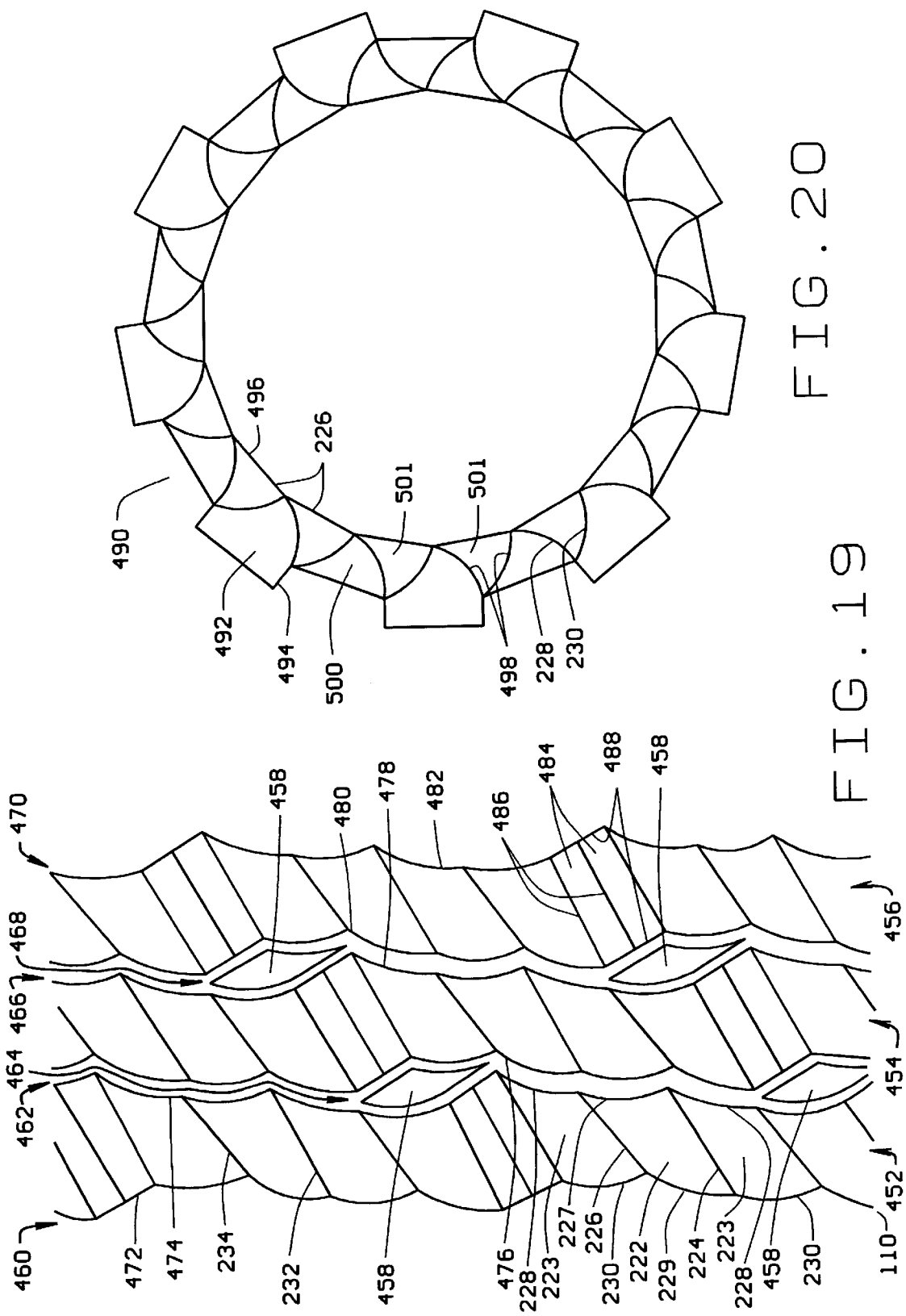

NEAR NET-SHAPE FABRICATION OF FRICTION DISK RING STRUCTURES

FIELD OF THE INVENTION

This invention fits into the broad field of mechanical arts. More particularly, it fits into the field of sheet material manipulation in transport vehicle manufacture. Specifically, it relates to methods for the manufacture of friction disk rings for brakes and clutches in vehicles such as automobiles and airplane landing gear.

BACKGROUND OF THE INVENTION

Friction disk rings are typically used in vehicles, e.g., race cars, air plane landing gear, off-road vehicles, and passenger automobiles, as components of brakes and clutches. Well known friction disk rings are usually fabricated from "papers" composed of randomly oriented fibers, e.g. kevlar fiber, carbon fiber, cellulose fiber, and others, resin binder, recycled materials, and filler, or the disk rings can also be made of woven (i.e. nonrandomly oriented) cloth using various fiber materials. The size of these friction disk rings varies from a few inches to a few tens of inches in outer diameter (OD).

Due, at least in part, to the manufacturing process and raw material cost, carbon-fiber cloth is expensive. Carbon-fiber cloth is made by spinning liquid polymeric precursors, e.g., poly-acrylyl-nitrile (PAN) and mesophase pitch, into a fibrous form. The fiber is woven into cloth. The cloth is then oxidized at about 200° C. and pyrolyzed at about 1000° C. for a few hours. All of the organic volatiles burn up, leaving pure carbon-fiber cloth.

Carbon-based friction disks are generally made by densifying porous fibrous preforms. Such preforms can be made by either stitching multiple layers of carbon-fiber cloth or by hot pressing multiple layers of carbon-fiber cloth along with thermal-set resin binder followed by a pyrolysis process at elevated temperatures. The preforms can then be densified with carbon vapor deposition (CVD) which is thought to be an advantageous form of carbon use in friction surfaces. However, stitching carbon fiber cloth is thought to be advantageous because the carbon-fiber used to stitch layers of cloth together is generally oriented perpendicular to the outer exposed friction surface. This orientation allows the fibers to conduct heat away from the exposed friction surface for better wear.

Known methods of producing friction disks suffer from a very low materials utilization rate. That is, there is a high waste of sheet or cloth materials as currently utilized in the field of friction disk fabrication. For example, if 1-ply rings with ID of 4.175 in. and OD of 4.98 in. are cut from a rectangular sheet, there will be approximately a 73% waste of material. In the automotive transmission industry, friction paper waste can be as high as about 80%–90%.

Accordingly, it would be desirable to provide a method of fabricating a friction disk ring that substantially reduces, or eliminates wasted friction paper or cloth. It also would be desirable if the method of fabricating could be automated, and was capable of producing practically any size disk ring. Further, it would be desirable to provide a friction disk ring having grooves and patterns being symmetric with respect to the radial center of the disk ring.

SUMMARY OF THE INVENTION

In one embodiment, carbon-fiber (or other friction material) cloth is cut into tiled trapeziform strips that are substantially linear. The strips are folded in a zig-zag pattern and formed into disk ring structures. The disk ring structures are then either hot-pressed or stitched to preserve the disk ring structures. Thereafter, the rings are applied to brakes, clutches, etc. using techniques well known to those skilled in the art. An alternative embodiment utilizes one-way folding to fabricate friction disk rings.

The above method allows controlled uniform fiber orientation around the ring unlike current ring fabrication methods. Also, the trapeziform panel edges form groove patterns that can be radially symmetric. The trapeziform panels can be varied in style and size allowing for a variety of ring structures and sizes as well as groove structures in the rings.

The rings fabricated from the above method are overlaid 2-ply disk rings, i.e., there is a double layer everywhere and no gaps between adjoining trapeziform edges. Nearly 100% of the friction cloth material is utilized and rings of virtually any desired thickness that are 2-ply or above can be formed by folding a trapeziform strip into a spiral ring. The turns of the ring are overlaid one on top of the other until the desired thickness for the ring is reached. In this manner, thick disk rings (e.g., for aircraft brakes) can be made by using multiple turns of friction cloth material and compressing the material into a spiral. Also, the ring width can be made slightly larger than needed, and the corners trimmed and rounded off to fit the desired size. Strip folding into spiral ring structures utilizing nearly 100% of the friction fabric is a method that can easily be automated since the geometry of the strips is simple.

BRIEF DESCRIPTION OF THE DRAWINGS

FIG. 2 is a schematic of a series of trapeziform paneled strips according to one embodiment of the present invention.

FIG. 3 is a schematic of a series of trapeziform paneled strips according to another embodiment of the present invention.

FIG. 4 is a schematic of a series of trapeziform paneled strips according to a further embodiment of the present invention.

FIG. 9 is a schematic of a friction disk ring structure fabricated from one of the strips shown in FIG. 4.

FIG. 10 is a partial cross-sectional view of the disk ring structure shown in FIG. 7.

FIG. 11 is a schematic of a known radially asymmetric friction disk ring fabricated from known methods.

FIG. 12 is a partial schematic of the disk ring structure shown in FIG. 10.

FIG. 13 is a schematic of a series of trapeziform paneled strips according to another embodiment of the present invention.

FIG. 14 is a schematic of a friction disk ring structure, including keyways forming a portion of an outer perimeter, fabricated from one of the strips shown in FIG. 13.

FIG. 15 is a schematic of a series of trapeziform paneled strips according to a further embodiment of the present invention.

FIG. 16 is a schematic of a friction disk ring structure, including keyways forming a portion of an inner perimeter, fabricated from one of the strips shown in FIG. 15.

FIG. 17 is a schematic of a series of trapeziform paneled strips according to a still further embodiment of the present invention.

FIG. 18 is a schematic of a friction disk ring structure, including keyways forming an entire outer perimeter, fabricated from one of the strips shown in FIG. 17.

FIG. 19 is a schematic of a series of trapeziform paneled strips according to yet another embodiment of the present invention.

FIG. 20 is a schematic of a friction disk ring structure, including keyways forming a portion of an outer perimeter, fabricated from one of the strips shown in FIG. 19.

DETAILED DESCRIPTION

Figure 1:
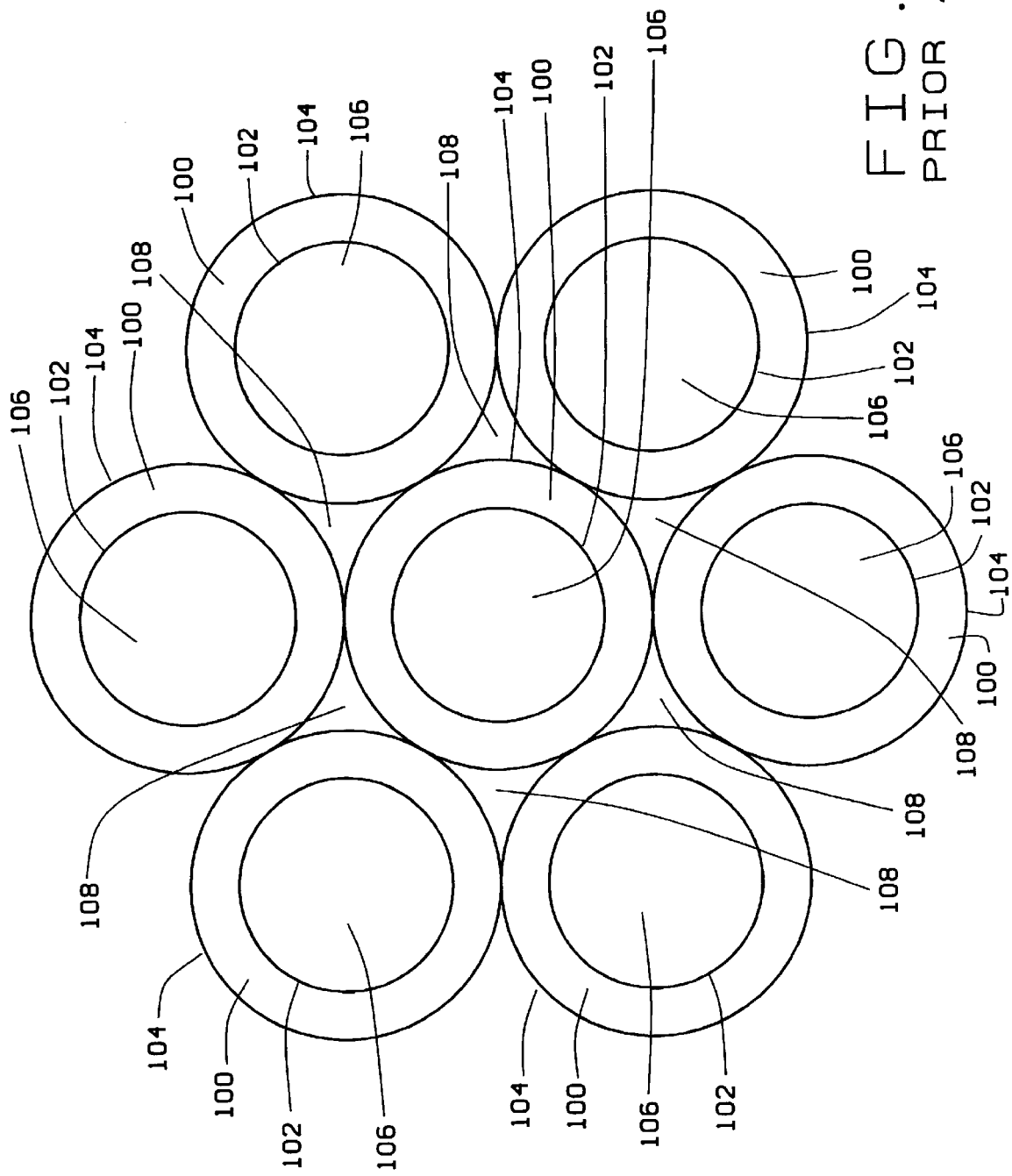
FIG. 1 is a schematic illustrating a known method of cutting friction disk ring material from a section of friction fabric.

FIG. 1 illustrates a known method of cutting friction fabrics to form a plurality of disk rings 100. Disk rings 100 each include an inner surface 102 and an outer surface 104. Disk ring 100 is a typical disk ring cut from hexagonal arrays. The hexagonal array cutting of disk ring 100 results in much waste of friction fabric as exemplified by wasted interior 106 of disk ring 100 and also wasted exterior 108 between disk rings 100. There will be approximately a 73% waste, depending on ID and OD, of material in the cutting of disk rings 100 from a rectangular section of friction fabric. The avoidance of waste 106, 108 is important because friction fabrics, such as carbon fiber cloth or kevlar-based paper, are quite expensive.

FIG. 2 is a schematic of a section of friction fabric 110 after it has been cut into tiled trapeziform paneled strips 112, 114, 116. Paneled strips 112, 114, 116 are formed by cutting friction fabric 110 at locations 118, 120, 122, 124 to create edge portions 126, 128, 130, 132, 134, 136. There is substantially no wasted material between strips 112, 114, 116 because of their tiled nature. For example, edge portion 128 of strip 112 utilizes friction fabric 110 right up to edge 130 of adjacent strip 114. Strips 112, 114, 116 include a plurality of trapeziform panels 138 each having a base 140, a top 142, and two sides 144, 146. Trapeziform panels 138 are arranged alternately base-to-base 148 and then top-to-top 150 in strip 112.

FIG. 3 is a schematic of another section of friction fabric 110 after it has been cut into tiled trapeziform paneled strips 152, 154, 156 having curved sides 158. Paneled strips 152, 154, 156 are formed by cutting friction fabric 110 at locations 160, 162, 164, 166 to create edge portions 168, 170, 172, 174, 176, 178. Again, there is substantially no wasted material between strips 152, 154, 156 because of their tiled nature. For example, curved edge portion 170 of strip 152 utilizes friction fabric 110 right up to edge 172 of adjacent strip 154. Strips 152, 154, 156 include a plurality of trapeziform panels 180 each having a base 182, a top 184, and two sides 186, 188. Trapeziform panels 180 are arranged alternately base-to-base 190 and then top-to-top 192 in strip 152.

FIG. 4 is a schematic of a further section of friction fabric 110 after it has been cut into tiled trapeziform paneled strips 194, 196, 198 having curved sides 200. Paneled strips 194, 196, 198 are formed by cutting friction fabric 110 at locations 202, 204, 206, 208 to create edge portions 210, 212, 214, 216, 218, 220. As described above, there is substantially no wasted material between strips 194, 196, 198 because of their tiled nature. For example, curved edge portion 212 of strip 194 utilizes friction fabric 110 right up to edge 214 of adjacent strip 196. Strips 194, 196, 198 include a plurality of trapeziform panels 222, 223 that alternate along strips 194, 196, 198. Panels 222 have a base 224, a top 226, and two sides 228, 230. Panels 223 have a base 224, a top 226, and two sides 227, 229. Trapeziform panels 222, 223 are arranged alternately base-to-base 232 and then top-to-top 234 in strips 194, 196, 198.

Figure 5:
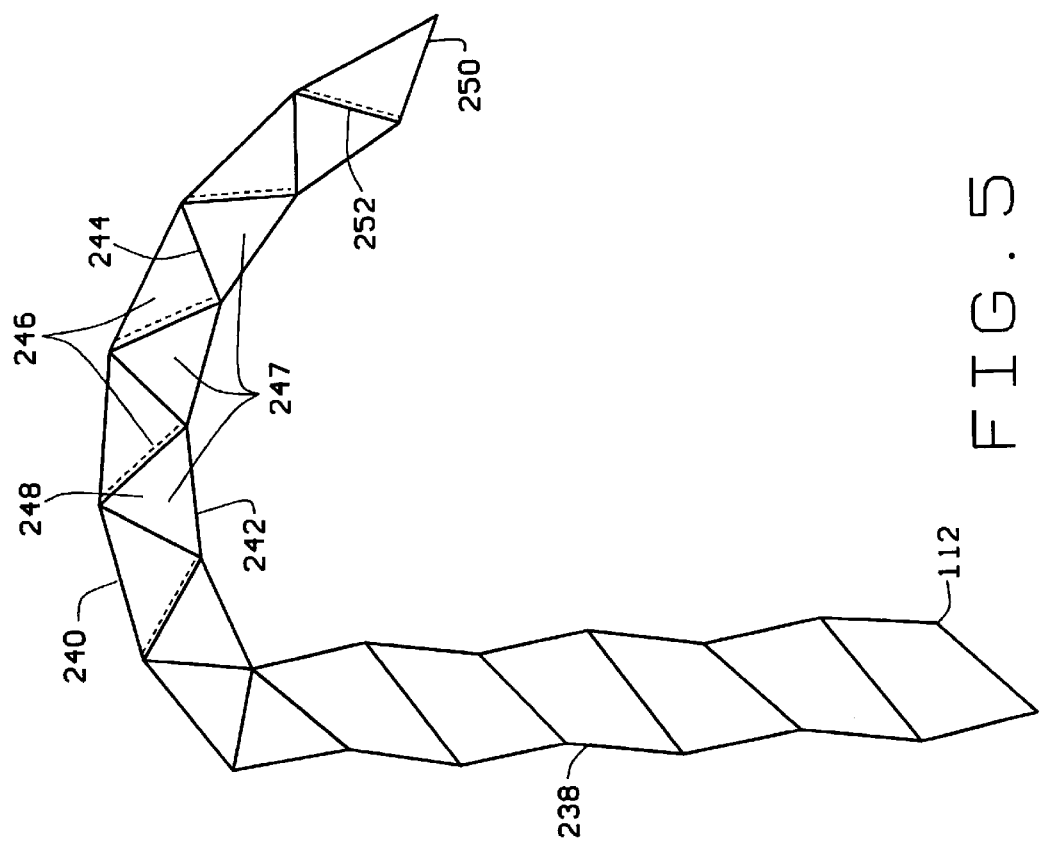
FIG. 5 is a schematic of one of the trapeziform paneled strips shown in FIG. 2 illustrating how the strips are zig-zag folded into friction disk rings.

FIG. 5 is a schematic of paneled strip 112 being zig-zag folded into a ring structure 236. An unfolded portion 238 of strip 112 includes trapeziform panels 138 that are about to be zig-zag folded at bases 140 and tops 142 such that bases 140 will form an outer perimeter 240 of disk ring structure 236 and tops 142 will form an inner perimeter 242 of disk ring structure 236. The methods of zig-zag folding include pressing, stitching, bonding, trapeziform panels 138 together like an accordion to form disk ring structure 236. After strip 112 has been zig-zag folded, sides 144, 146 of panels 138 form internal boundaries 244 of triangular-shaped panels 246, 247 that form a surface 248 of disk ring structure 236. A boundary 250 of triangular shaped panels 246 includes sides 144, 146, and base 140 of trapeziform panels 138. A boundary 252 of triangular shaped panels 247 include sides 144, 146, and top 142 of trapeziform panels 138. Internal boundaries 244 can be utilized to form groove channels either by molding these groove channels integrally during hot pressing, or by machining after disk ring structure 236 is fabricated. In one embodiment, disk ring structure 236 circles underneath itself to form a many layered disk ring structure. The zig-zag folding of strip 112 into disk ring structures 236 having multiple layers can be automated and thus, disk ring structures 236 having virtually any thickness can be produced.

Figure 6:
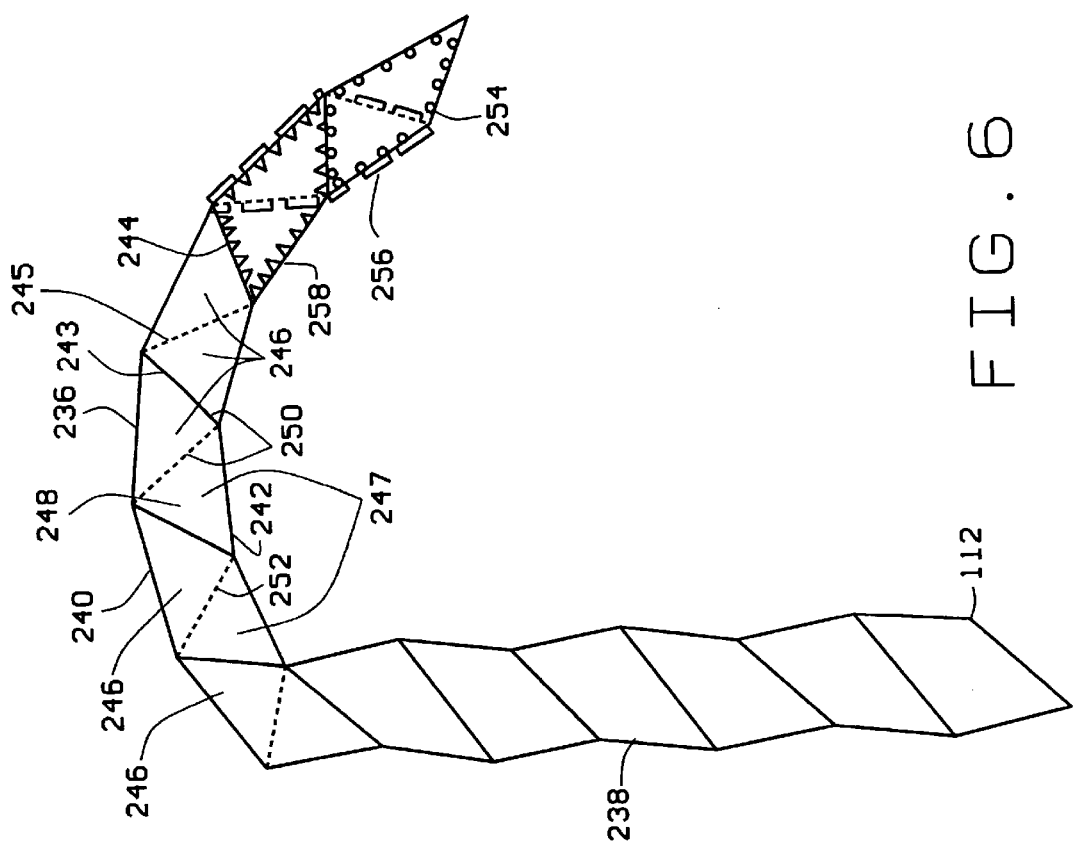
FIG. 6 is a schematic of one of the trapeziform paneled strips shown in FIG. 2 illustrating how the strips are one-way folded into friction disk rings.

FIG. 6 is a schematic of paneled strip 112 being one-way folded into ring structure 236. As described above, unfolded portion 238 of strip 112 includes trapeziform panels 138 that are about to be folded at bases 140 and tops 142 such that bases 140 will form outer perimeter 240 of disk ring structure 236 and tops 142 will form inner perimeter 242 of disk ring structure 236. The method of one-way folding includes wrapping trapeziform panels 138 around each other either in a clockwise direction or in a counterclockwise direction to form disk ring structure 236. FIG. 6 illustrates strip 112 being one-way folded in a clockwise direction. After strip 112 has been one-way folded, sides 144, 146 of panels 138 form an upper internal boundary 243 and a lower internal boundary 245 of triangular-shaped panels 246, 247 that form a surface 248 of disk ring structure 236. Upper internal boundaries 243 are on a surface opposite to the surface that includes lower internal boundaries 245. Outer boundary 250 of triangular shaped panels 246 include sides 144, 146, and base 140 of trapeziform panels 138. Outer boundary 252 of triangular shaped panels 247 include sides 144, 146, and top 142 of trapeziform panels 138. Internal boundaries 243, 245 can be utilized to form groove channels either by molding these groove channels integrally during hot pressing, or by machining after disk ring structure 236 is fabricated. In one embodiment, disk ring structure 236 circles underneath itself to form a many layered disk ring structure. The one-way folding of strip 112 into disk ring structure 236 having multiple layers can be automated and thus, disk ring structures 236 having virtually any thickness can be produced.

Strip 112 can be either zig-zag folded or one-way folded by using an embodiment of the present invention. First, paneled strip 112 is folded along a top 142 so that a first trapeziform panel 254 and a second trapeziform panel 256 partially overlap. Next, the overlapping portions of trapeziform panels 254, 256 are secured together, e.g., by stitching, sewing, or adhering. Then paneled strip 112 is folded along base 140 of second trapeziform panel 256 so that second panel 256 and a third trapeziform panel 258 partially overlap. The overlapping portions of trapeziform panels 256, 258 are then adhered together as described above. The method is repeated until a completed disk ring is formed. The method can be continued to fabricate a disk ring having a thickness of greater than two layers, or the method can be terminated when a completed two layers is formed.

Figure 7:
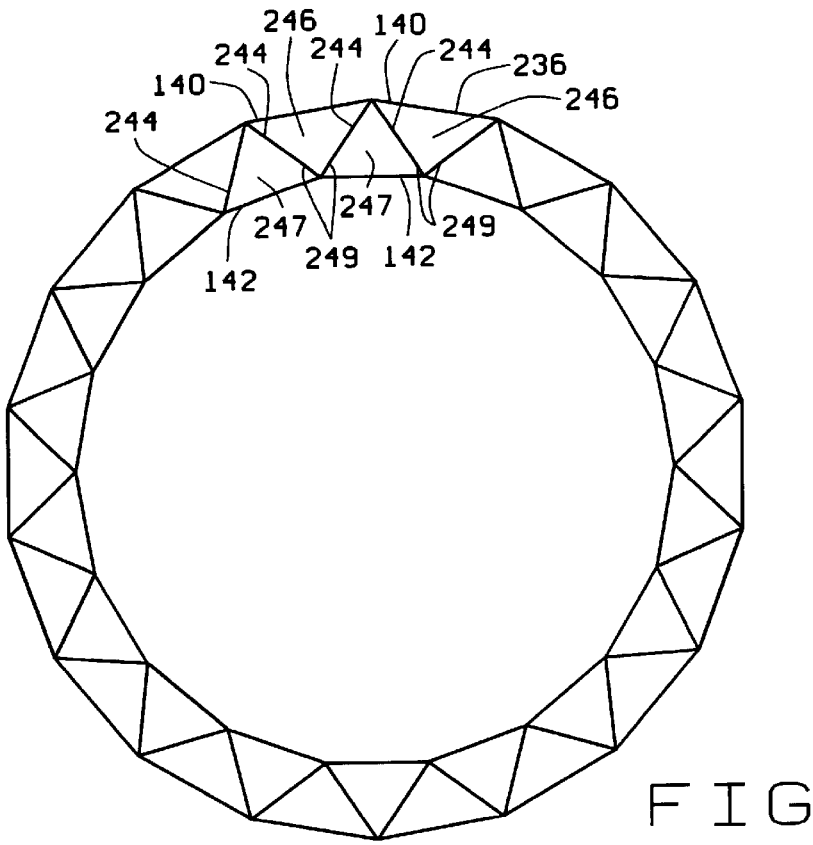
FIG. 7 is a schematic of a friction disk ring structure fabricated from one of the strips shown in FIG. 2.

FIG. 7 is a schematic of disk ring structure 236 formed from paneled strip 112 (not shown in FIG. 7). Paneled strip 112 is either zig-zag folded or one-way folded to form disk ring structure 236. As described above, trapeziform bases 140 form outer perimeter 240 of disk ring structure 236 and trapeziform tops 142 form inner perimeter 242 of disk ring structure 236. Also, sides 144, 146 (not shown) form internal boundaries 244 of triangular shaped panels 246, 247. Internal boundaries 244 can be utilized to form a plurality of groove channels 249 either by molding groove channels 249 integrally during hot pressing, or by machining after disk ring structure 236 is fabricated.

Figure 8:
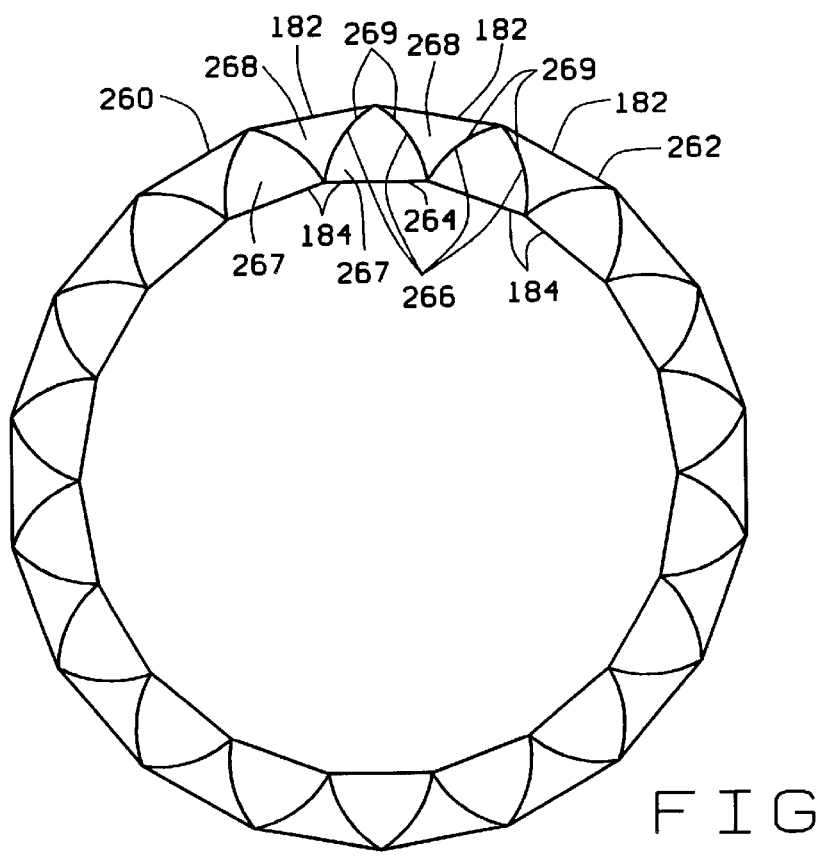
FIG. 8 is a schematic of a friction disk ring structure fabricated from one of the strips shown in FIG. 3.

FIG. 8 is a schematic of another disk ring structure 260 formed from paneled strip 152 (not shown in FIG. 8). Paneled strip 152 is either zig-zag folded or one-way folded, in a manner similar to the above described methods, to form disk ring structure 260. Trapeziform bases 182 form an outer perimeter 262 of disk ring structure 260 and trapeziform tops 184 form an inner perimeter 264 of disk ring structure 260. Curved sides 186, 188 (not shown) form internal boundaries 266 of curved triangular shaped panels 267, 268. Internal boundaries 266 can be utilized to form groove channels 269. Curved triangular panels 267, 268 provide friction disk ring structure 260 different performance characteristics than triangular panels 246 (not shown in FIG. 8). Curved triangular panels 267, 268 are radially symmetric in disk ring structure 260.

FIG. 9 is a schematic of a further disk ring structure 270 formed from paneled strip 194 (not shown in FIG. 9). Paneled strip 194 is either zig-zag folded or one-way folded, in a manner similar to the above described method, to form disk ring structure 270. Trapeziform bases 224 (not shown) form an outer perimeter 272 of disk ring structure 270 and trapeziform tops 226 form an inner perimeter 274 of disk ring structure 270. Curved sides 228, 230 (not shown) form an internal boundary 276 of curved triangular shaped panels 277, 278. Internal boundary 276 can be utilized to form groove channels 279 either by molding or machining after disk ring structure 270 is fabricated. Curved triangular panels 277, 278 provide friction disk ring structure 270 different performance characteristics than either triangular panels 246, 247 (not shown in FIG. 8) or curved triangular panels 267, 268 since curved triangular panels 277, 278 are radially asymmetric in disk ring structure 270.

FIG. 10 is a cross-sectional view of folded disk ring structure 236. As trapeziform paneled strips 112 (not shown In FIG. 10) are folded into disk ring structure 236, a uniform two-ply layer 280 of friction fabric 110 results including triangular portions 246. Two-ply layer 280 includes a first layer 282 and a second layer 284. In one embodiment, as strip 112 is formed into trapeziform panels 138 that are then arranged into disk ring structure 236, each trapeziform panel 138 is partially located in first layer 282 and in second layer 284. In this embodiment, each trapeziform panel 138 is divided into two triangular portions 246, one triangular portion 246 is located in first layer 282 and the other triangular portion 246 is located in second layer 284.

FIG. 11 is a schematic of a friction disk ring 286 fabricated from known methods. Friction disk ring 286 is radially asymmetric as is well known in the art. Friction disk ring 286 has been cut from friction fabric 110 as described above in regard to FIG. 1. Friction disk ring 286 has a plurality of fibers 288 that are not symmetric with respect to a center 290 of disk 286. Radial symmetry of fibers 288 is important because it is desirable that friction characteristics remain constant at any location on a surface 292 of disk 286. In friction disks that are radially asymmetric, friction characteristics can vary from location to location around the disk. Thus, radial asymmetry may cause problems in certain applications. For these reasons, it is desirable to have a friction disk ring having fibers that are radially symmetric.

FIG. 12 is a partial schematic of disk ring structure 236 illustrating the radial symmetry of zig-zag folding woven friction fabric 110. Friction paper (not shown) has randomly oriented fibers with respect to a plane of the paper. However, friction fabric 110, which is woven, includes fibers 294 that are oriented in only two directions. Such is the case, for example with pure carbon fiber fabric, utilized in high performance friction applications. When friction fabric 110 is folded into disk ring structure 236 according to one embodiment of this invention, disk ring structure 236 possesses a radial symmetry of fibers 294 with respect to a center 296 of disk ring 236. For example, disk ring structure 236 has outer perimeter 240 and inner perimeter 242 and includes triangular panels 246 having fibers 294 oriented symmetrically with respect to disk center 296.

FIG. 13 is a schematic of another section of friction fabric 110 after it has been cut into tiled trapeziform paneled strips 298, 300, 302 and remaining portions 304. Strips 298, 300, 302 and remaining portions 304 are formed by cutting friction fabric 110 at locations 306, 308, 310, 312, 314, 316 to create edge portions 318, 320, 322, 324, 326, 328 and remaining portions 304. Strips 298, 300, 302 include trapeziform panels 138 and keyway panels 330. Keyway panels 330 are used to form keyways (not shown in FIG. 13) in the resulting disk ring structure (not shown in FIG. 13) as explained below. In this embodiment, there is a small amount of material (i.e., remaining portions 304) that is wasted in the formation of a disk ring structure having a keyway. However, remaining portions 304 are a very small percentage of the friction fabric used in the disk ring.

As described above, trapeziform panels 138 include base 140, top 142, and sides 144, 146. Trapeziform panels 138 are arranged alternately base-to-base 148 and then top-to-top 150 in strip 298. In this embodiment, two keyway panels 330 are located adjacent every fourth trapeziform panel between two bases 140 i.e., keyway panels 330 are located between every other trapeziform base-to-base 148 pairing. Keyway panels 330 are rectangular and have two long sides 332 that are the same length as bases 140 and two short sides 334 that are the same length as the desired keyway height. Two keyway panels 330 are located next to each other to allow keyway panels 330 to be folded one on top of the other so that bases 140 on either side of keyway panels 330 align and are in contact with each other.

FIG. 14 is a schematic of a friction disk ring 336 that includes a plurality of keyways 338 separated by the length of one trapeziform base 140. Friction disk ring structure 336 is formed by either zig-zag folding or one-way folding paneled strip 298 (not shown in FIG. 14). The remaining trapeziform bases form the remaining portion of perimeter 340. As described above, trapeziform tops 142 form an inner perimeter 342 of disk ring 336 and sides 144, 146 (not shown) form internal boundaries 344 of a plurality of triangular shaped panels 345, 346. Internal boundaries 344 can be utilized to form groove channels 347 either by molding these groove channels integrally during hot pressing, or by machining after disk ring 336 is fabricated. In one embodiment, keyways 338 have a height of approximately 0.25 inches and are separated by one trapeziform base 140 along outer perimeter 340 of disk ring 336. Keyways 338, as well as the rest of disk ring 336, then have a thickness that is a multiple of 2 (i.e., 2,4,6,8, etc.) layers of friction fabric 110. Of course, keyways 338 can be varied in their height, their length, their shape, and their frequency by making only minor modifications to strip 298. For example, keyways 338 can be shorter than base 140, or longer than base 140. Other variations are detailed below, while still others will be obvious to those of ordinary skill in the art.

FIG. 15 is a schematic of a further section of friction fabric 110 after it has been cut into tiled trapeziform paneled strips 348, 350, 352 and remaining portions 354. Strips 348, 350, 352 and remaining portions 354 are formed by cutting friction fabric 110 at locations 356, 358, 360, 362, 364, 366 to create edge portions 368, 370, 372, 374, 376, 378 and remaining portions 354. Strips 348, 350, 352 include trapeziform panels 138 and keyway panels 380. As described above, keyway panels 380 are used to form keyways (not shown in FIG. 15) in the resulting disk ring structure (not shown in FIG. 15). In this embodiment, there is again a small amount of material (i.e., remaining portions 354) that is wasted in the formation of a disk ring structure having a keyway (not shown in FIG. 15). However, remaining portions 354 are a very small percentage of friction fabric 110 used in the disk ring.

As described above, trapeziform panels 138 include base 140, top 142, and sides 144, 146. Trapeziform panels 138 are arranged alternately base-to-base 148 and then top-to-top 150 in strip 348. In this embodiment, two keyway panels 380 are located adjacent every fourth trapeziform panel between two tops 142, i.e., between every other trapeziform top-to-top pairing. Keyway panels 380 are rectangular and have two long sides 382 that are the same length as tops 142 and two short sides 384 that are the same length as the desired keyway height. Two keyway panels 380 are located next to each other to allow keyway panels 380 to be folded one on top of the other during the fabrication of the disk ring structure. The folding of keyway panels 380 permits tops 142 on either side of keyway panels 380 to align and be in contact with each other.

FIG. 16 is a schematic of a friction disk ring 386 that includes a plurality of keyways 388 separated by the length of one trapeziform base 140. Friction disk ring structure 386 is formed by either zig-zag folding or one-way folding paneled strip 348 (not shown in FIG. 16). Keyways 388 form at least a portion of inner perimeter 390. Other portions of inner perimeter 390 are formed by trapeziform tops 142. As described above, trapeziform bases 140 form an outer perimeter 392 of disk ring 386 and sides 144, 146 (not shown) form internal boundaries 394 of a plurality of triangular shaped panels 395, 396. Internal boundaries 394 can be utilized to form groove channels 397 either by molding groove channels 397 integrally during hot pressing, or by machining after disk ring 386 is fabricated. In one embodiment, keyways 388 have a height of approximately 0.25 inches and are separated by one trapeziform top 142 along inner perimeter 390 of disk ring 386. Also, as described above, keyways 388, as well as the remaining disk ring 386, have a thickness that is a multiple of 2 (i.e., 2,4,6,8, etc.) layers of friction fabric 110.

FIG. 17 is a schematic of a still further section of friction fabric 110 after it has been cut into tiled trapeziform paneled strips 398, 400, 402 and remaining portions 404. Strips 398, 400, 402 and remaining portions 404 are formed by cutting friction fabric 110 at locations 406, 408, 410, 412, 414, 416 to create edge portions 418, 420, 422, 424, 426, 428 and remaining portions 404. Strips 398, 400, 402 include trapeziform panels 138 and keyway panels 430. As described above, keyway panels 430 are used to form keyways (not shown in FIG. 17) in the resulting disk ring structure (not shown in FIG. 17). In this embodiment, there is again a small amount of material (i.e., remaining portions 404) that is wasted in the formation of a disk ring structure having a keyway. However, remaining portions 404 are a very small percentage of friction fabric 110 used in the disk ring.

As described above, trapeziform panels 138 include base 140, top 142, and sides 144, 146. Trapeziform panels 138 are arranged keyway panel-to-base 432, top-to-top 150, and then base-to-keyway panel 434 in strip 398. In this embodiment, one keyway panel 430 is located adjacent every trapeziform panel base 140, i.e., two keyway panels 430 are located between every trapeziform bottom-to-bottom pairing. Keyway panels 430 are rectangular and have two long sides 436 that are the same length as bases 140 and two short sides 438 that are the same length as the desired keyway height. Two keyway panels 430 are located next to each other to allow keyway panels 430 to be folded one on top of the other during the fabrication of the disk ring structure. The folding of keyway panels 430 permits bottoms 140 on either side of keyway panels 424 to align and be in contact with each other.

FIG. 18 is a schematic of a friction disk ring 440 that includes a plurality of keyways 442 adjacent each other. Friction disk ring structure 440 is formed by either zig-zag folding or one-way folding paneled strip 398 (not shown in FIG. 18). Keyways 442 form an outer perimeter 444 of disk ring 440 and trapeziform tops 142 form an inner perimeter 446 of disk ring 440. Also, sides 144, 146 (not shown) form internal boundaries 448 of a plurality of triangular shaped panels 449, 450. Internal boundaries 448 can be utilized to form groove channels 451 either by molding groove channels 451 integrally during hot pressing, or by machining after disk ring 440 is fabricated. In one embodiment, keyways 442 have a height of approximately 0.1 inches and are located on every trapeziform base 140 along outer perimeter 444 of disk ring 440. Also, as described above, keyways 442, as well as the remaining disk ring 440, have a thickness that is a multiple of 2 (i.e., 2,4,6,8, etc.) layers of friction fabric 110.

FIG. 19 is a schematic of yet another section of friction fabric 110 after it has been cut into tiled trapeziform paneled strips 452, 454, 456 and remaining portions 458. Strips 452, 454, 456 and remaining portions 458 are formed by cutting friction fabric 110 at locations 460, 462, 464, 466, 468, 470 to create edge portions 472, 474, 476, 478, 480, 482 and remaining portions 458. Strips 452, 454, 456 include trapeziform panels 222, 223 and keyway panels 484. As described above, keyway panels 484 are used to form keyways (not shown in FIG. 19) in the resulting disk ring structure (not shown in FIG. 19). In this embodiment, there is again a small amount of material (i.e., remaining portions 452) that is wasted in the formation of a disk ring structure having a keyway. However, remaining portions 458 are a very small percentage of the total material used in the disk ring.

As described above, trapeziform panels 222 include base 224, top 226, and sides 228, 230 while trapeziform panels 223 include base 224, top 226, and sides 227, 229. Trapeziform panels 222, 223 are arranged alternately base-to-base 232 and then top-to-top 234 in strip 452. In the embodiment illustrated in FIG. 19, two keyway panels 484 are located adjacent every second trapeziform panel 222 between two bases 224, i.e., between every other trapeziform base-to-base pairing 232. Keyway panels 484 are rectangular and have two long sides 486 that are the same length as bases 224 and two short sides 488 that are the same length as the desired keyway height. Two keyway panels 484 are located next to each other to allow keyway panels 484 to be folded one on top of the other during the fabrication of the disk ring structure. The folding of keyway panels 484 permits bases 224 on either side of keyway panels 484 to align and be in contact with each other.

FIG. 20 is a schematic of a friction disk ring 490 that includes a plurality of keyways 492. Friction disk ring structure 490 is formed by either zig-zag folding or one-way folding paneled strip 450 (not shown in FIG. 20). Keyways 492 form a portion of an outer perimeter 494, the remaining trapeziform bases form the remaining portion of outer perimeter 494. As described above, trapeziform tops 226 form an inner perimeter 496 of disk ring 490 and sides 227, 228, 229, 230 (not shown) form internal boundaries 498 of a plurality of triangular shaped panels 499, 500. Internal boundaries 498 can be utilized to form groove channels 501 either by molding groove channels 501 integrally during hot pressing, or by machining after disk ring 490 is fabricated. In one embodiment, keyways 492 have a height of approximately 0.25 inches and are separated by one trapeziform base 224 along outer perimeter 494 of disk ring 490. Also, as described above, keyways 492, as well as the remaining disk ring 490, have a thickness that is a multiple of 2 (i.e., 2,4,6,8, etc.) layers of friction fabric 110.

The disk rings fabricated by the above methods utilize nearly 100% of the starting material, e.g., friction fabric. The method can be automated to rapidly and efficiently fabricate friction disk rings. Keyways can be integrally formed on either an inner perimeter or and outer perimeter of the disk rings.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

We claim:

1. A method for fabricating sheet material into friction disk ring structures comprising:
   cutting a strip from the sheet material;
   folding the strip to form a disk ring; and
   securing the folded strip to remain in the disk ring form;
   wherein said step of forming a disk ring comprises:
      folding the strip into a pattern of a plurality of trapeziform panels and a plurality of rectangles, each trapeziform panel having a top, a bottom, and two sides, and each rectangle having two long sides and two short sides;
      arranging the trapeziform panels and rectangles to form a disk ring having a plurality of keyways.

2. A method in accordance with claim 1 wherein said step of arranging the trapeziform panels comprises:
   folding the strip along a trapeziform top separating a first and a second trapeziform panel to form a partial overlap between the first and second trapeziform panels;
   securing the overlapped portion of the first and second trapeziform panels together;
   folding the strip along a rectangle long side separating a first and a second rectangle to form at least a partial overlap between the first and second rectangles;
   securing the overlapped portion of the first and second rectangles together; and
   repeating the above method steps until a completed disk ring having keyways has been formed.

3. A method in accordance with claim 2 wherein said step of forming an overlap comprises forming a groove channel at an internal boundary of the trapeziform panels.

4. A method in accordance with claim 3 wherein said step of forming a groove channel comprises molding the groove channel integrally during hot pressing.

5. A method in accordance with claim 3 wherein said step of forming a groove channel comprises machining the groove channel after the disk ring is fabricated.

6. A method in accordance with claim 1 wherein the trapeziform panels have curved sides.

7. A method in accordance with claim 1 wherein the sheet material is selected from the group consisting of friction paper and friction cloth.

8. A method in accordance with claim 7 wherein the friction paper is kevlar-based and the friction cloth is carbon fiber cloth.

9. A method in accordance with claim 1 wherein said steps of securing comprise a method selected from one of the group consisting of sewing, stitching, and adhering.

10. A method in accordance with claim 1 wherein said step of folding comprises a method selected from one of the group consisting of zig-zag folding and one-way folding.

11. A method in accordance with claim 1 wherein the trapeziform panels alternate in right side up-up side down orientation along a length of the strips.

12. A method in accordance with claim 1 wherein said step of cutting a strip from the sheet material comprises cutting a substantially linear strip.

* * * * *